Z. MARTELL.
TENON CUTTING MACHINE.
APPLICATION FILED OCT. 5, 1914.

1,153,938.

Patented Sept. 21, 1915.
7 SHEETS—SHEET 1.

WITNESSES

INVENTOR

Att'ys

Z. MARTELL.
TENON CUTTING MACHINE.
APPLICATION FILED OCT. 5, 1914.

1,153,938.

Patented Sept. 21, 1915.
7 SHEETS—SHEET 4.

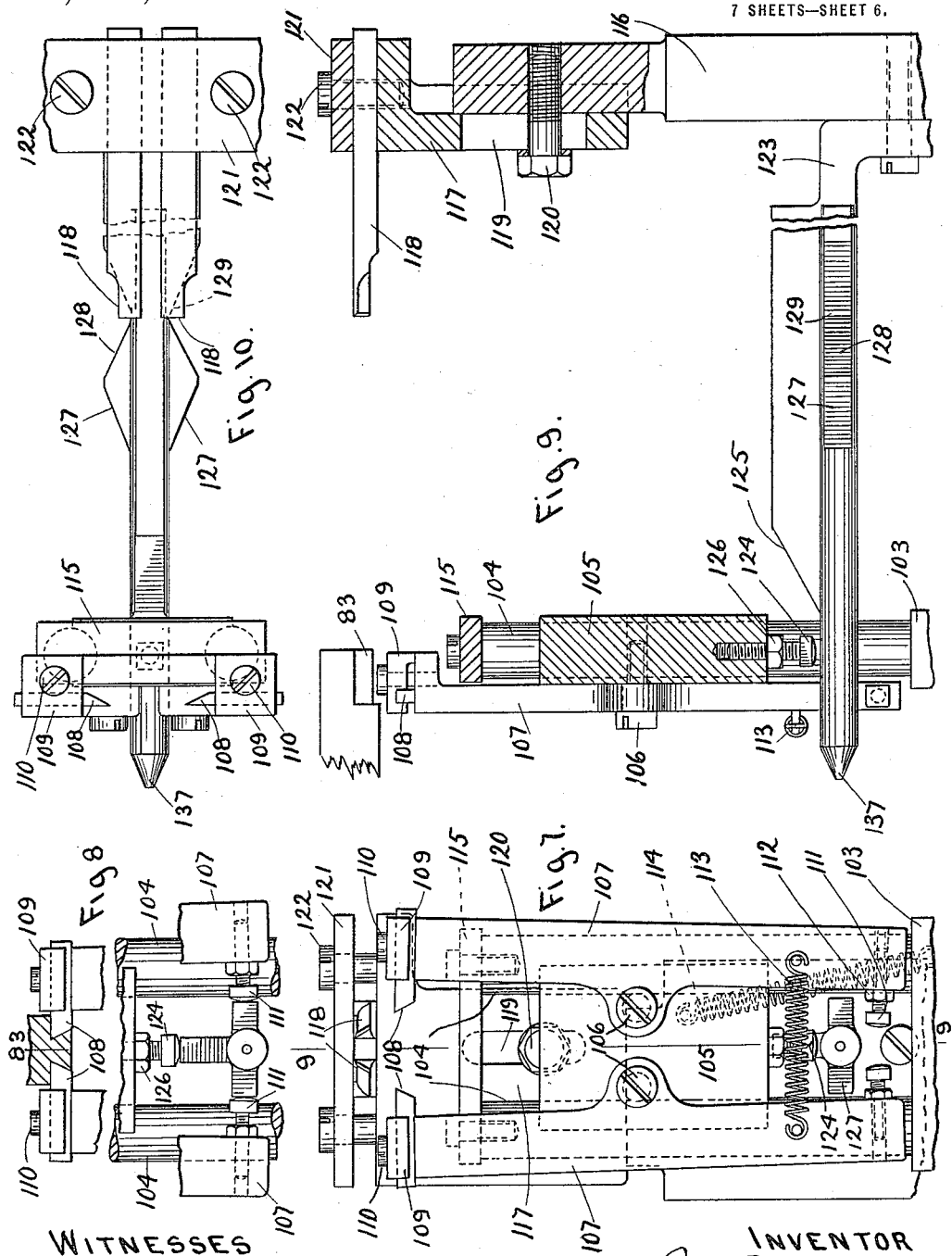

Z. MARTELL.
TENON CUTTING MACHINE.
APPLICATION FILED OCT. 5, 1914.

1,153,938.

Patented Sept. 21, 1915.
7 SHEETS—SHEET 7.

WITNESSES
Josephine H. Ryan
Charles S. Woodbury

INVENTOR
Zeno Martell
by Roberts, Roberts & Cushman
Att'ys

UNITED STATES PATENT OFFICE.

ZENO MARTELL, OF BEDFORD, OHIO.

TENON-CUTTING MACHINE.

1,153,938.  Specification of Letters Patent.  Patented Sept. 21, 1915.

Application filed October 5, 1914. Serial No. 865,034.

*To all whom it may concern:*

Be it known that I, ZENO MARTELL, citizen of the United States, and resident of Bedford, in the county of Cuyahoga and State of Ohio, have invented new and useful Improvements in Tenon-Cutting Machines, of which the following is a specification.

This invention relates to a tenon cutting machine, and particularly a wood-working machine for forming a dovetailed tenon of the concealed or lapped type, and consists in the novel and improved mechanism hereinafter described, which presents sticks or blanks of wood successively to the tenon-forming mechanisms, and to finishing cutters by which the inner three-sided corners between the tenon and the shoulders are cut out and finished, all of said operations being performed automatically. These and other features of the invention will hereinafter be more particularly described and pointed out in the claims.

Figure 1:
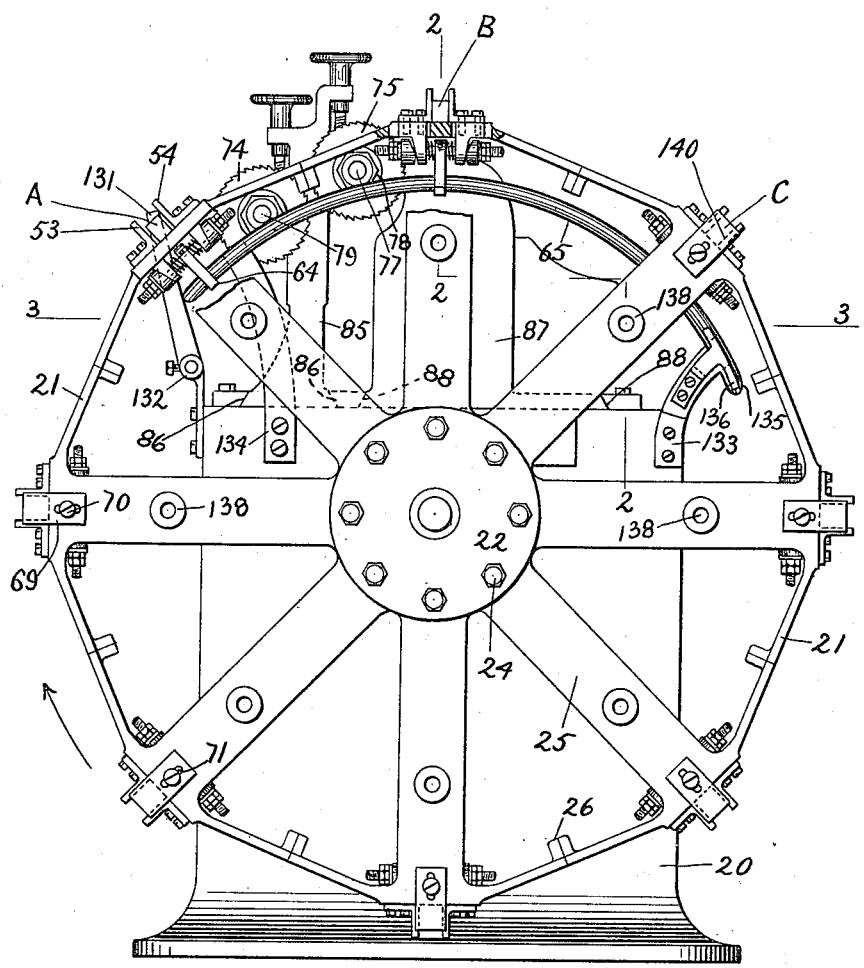
Figure 2:
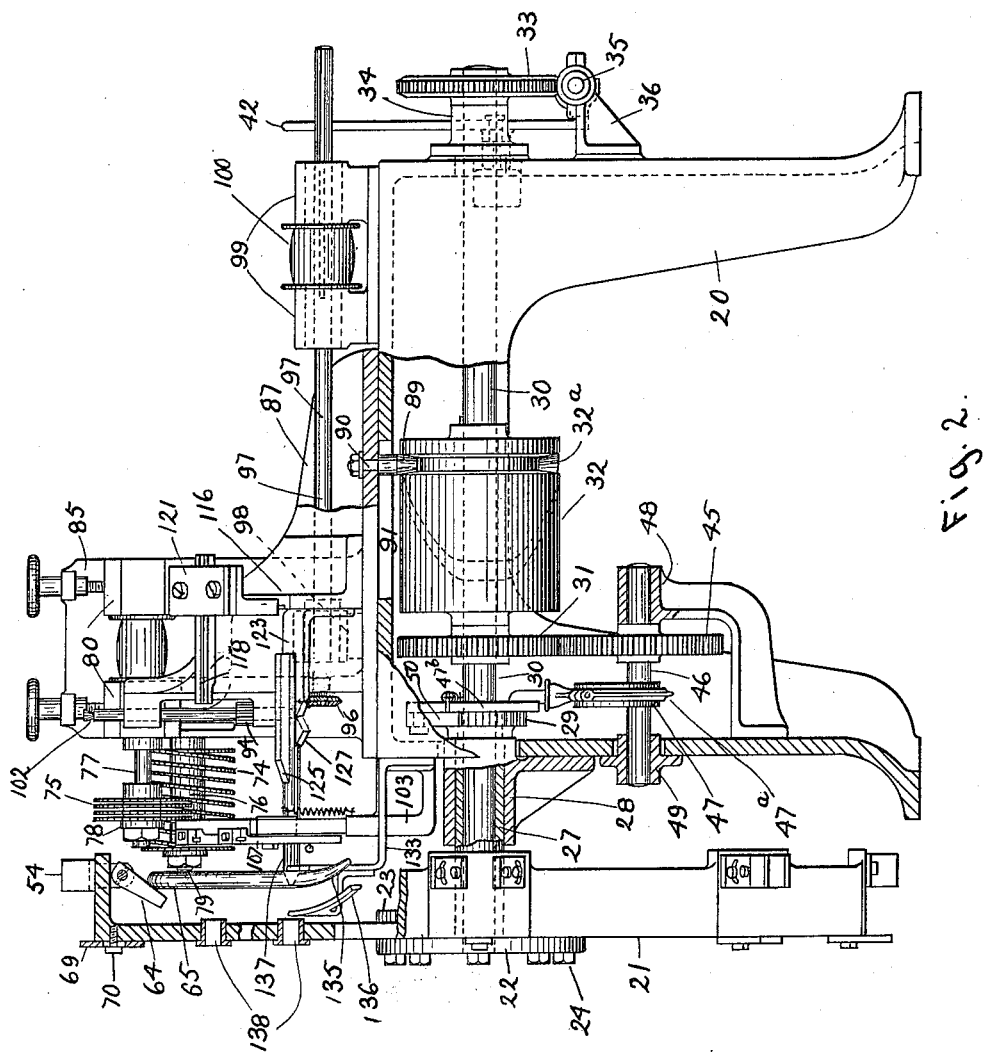
Figure 3:
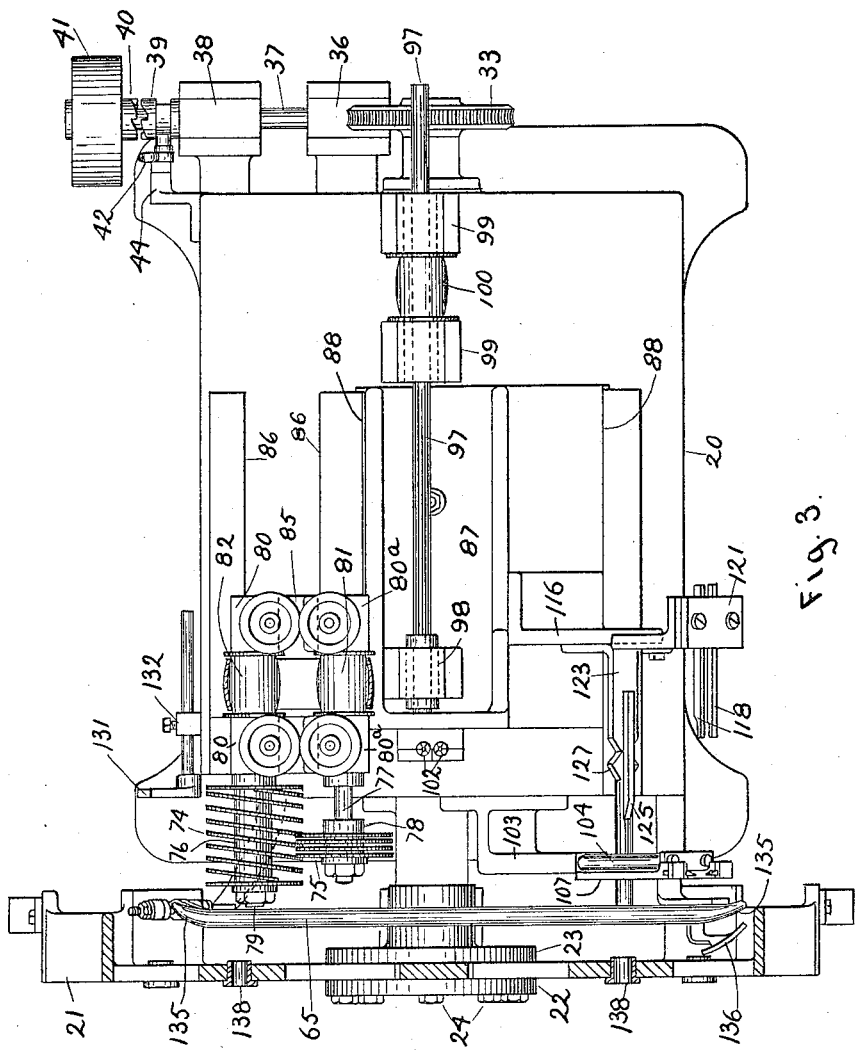
Figure 4:
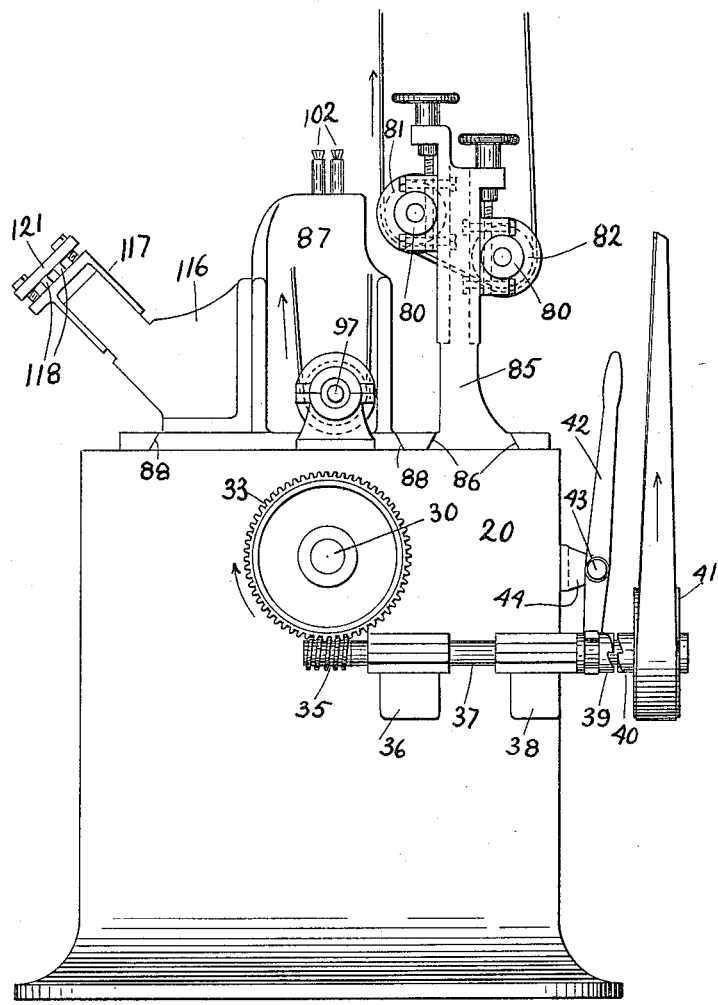
Figure 5:
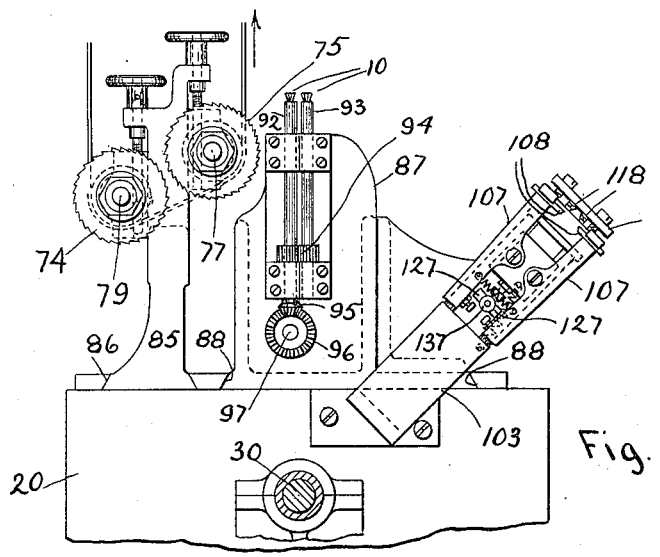
Figure 6:
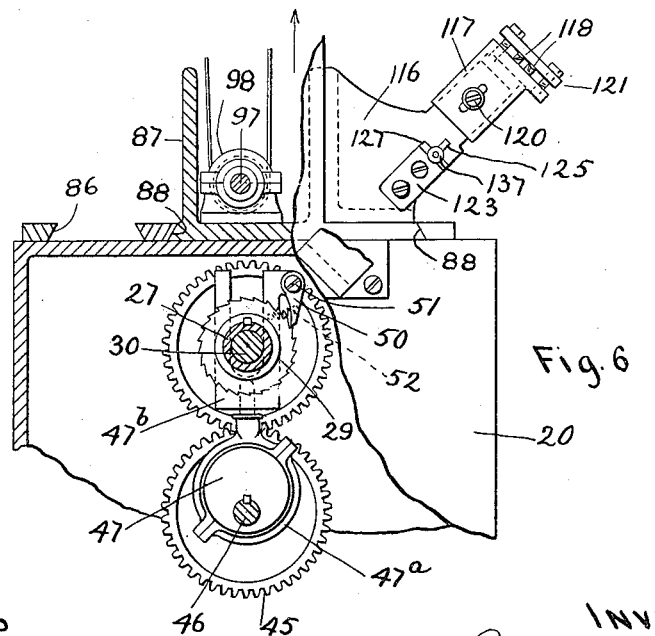
Figure 16:
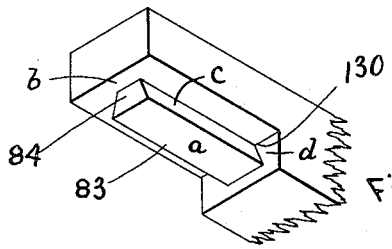
Figure 17:
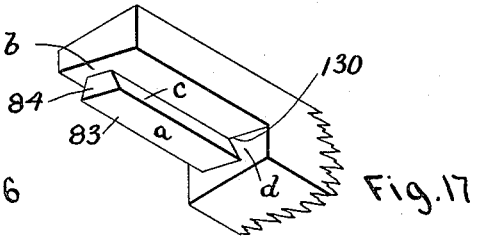
Figure 12:
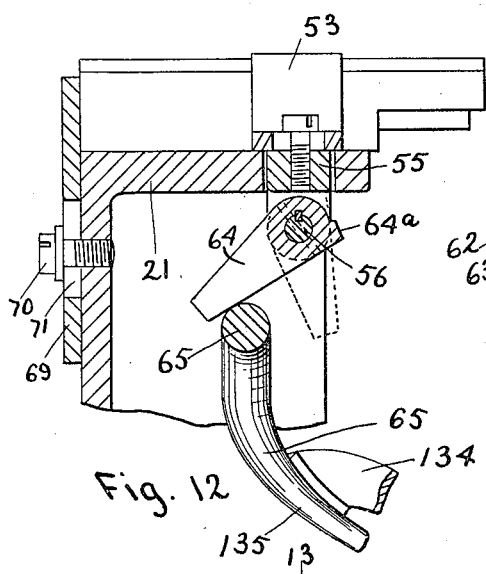
Figure 13:
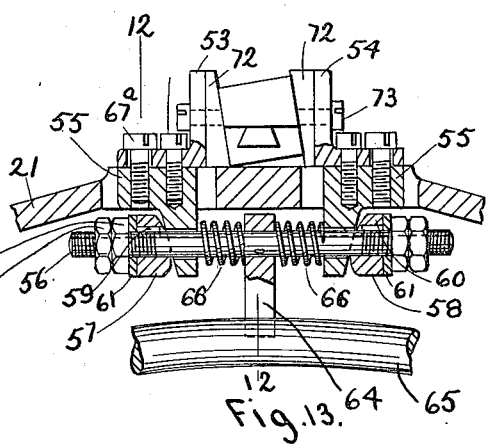
Figure 15:
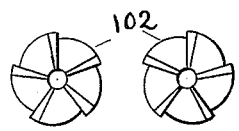
Figure 11:
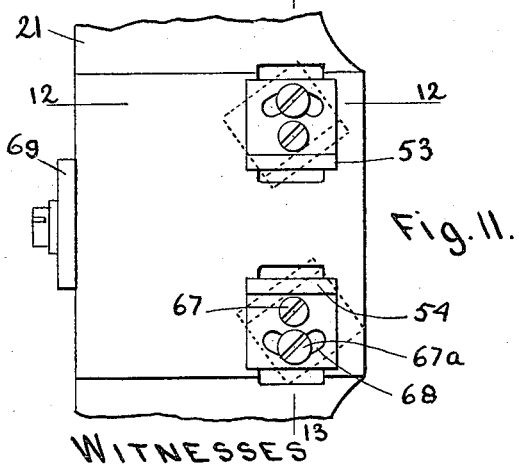
Figure 14:
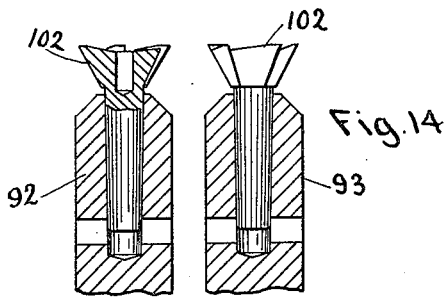

In the accompanying drawings which illustrate one embodiment of the invention, such embodiment constituting but one exemplification of many forms in which the invention may be used,—Figure 1 is a front elevation of the machine, parts of the turret being broken away; Fig. 2 is a side elevation of the machine with the frame and turret in section on line 2—2 of Fig. 1, and partly broken away; Fig. 3 is a plan view of the machine, the turret being shown in section on line 3—3 of Fig. 1; Fig. 4 is a rear elevation of the machine; Fig. 5 is a front elevation of the several tenon-forming and corner-finishing devices, and of the supporting heads upon which said devices are mounted; Fig. 6 is a front view, partly in section and partly broken away, showing certain of the driving connections hereinafter described; Fig. 7 is an enlarged front view of the corner-finishing or trimming head; Fig. 8 is a similar view to Fig. 7, parts being broken away, showing the tools in working position; Fig. 9 is a sectional view through line 9—9 of Fig. 7; Fig. 10 is a plan view of the parts shown in Fig. 9; Fig. 11 is an enlarged plan view of a pair of the clamping members carried by the turret; Fig. 12 is a sectional view of said clamping device on line 12—12 of Fig. 13; Fig. 13 is a sectional view of said clamping device on line 13—13 of Fig. 11; Fig. 14 is an enlarged detail showing a pair of tenon cutters partly in section and partly in elevation; Fig. 15 is a plan view of the cutters shown in Fig. 14; Fig. 16 is a perspective view of a finished dovetailed tenon cut on said machine; and Fig. 17 is a perspective view of a similar dovetailed tenon cut upon said machine at an angle to the face of the stick.

Referring to the drawings: 20 represents the frame of the machine upon which all the working parts are mounted, and 21 is a rotary carrier or turret by which the pieces of wood to be operated upon are presented to the several cutting instrumentalities. The turret 21 is made up of a series of segments supported on arms 25, which are held together in the relation best shown in Fig. 1 by a plate 22 and flanged hub 23, between which the inner ends of arms 25 are secured by bolts 24. The ends of the several segments are connected one to another by ears 26. Said turret is mounted on a hollow shaft or sleeve 27 (Fig. 2) which has its bearing in journal box 28 secured to the machine frame 20. Said hollow shaft 27 extends through the journal box and frame, and carries on its inner end a ratchet wheel 29 (Figs. 2 and 6) by which the turret is intermittently rotated. The main driving shaft for actuating the rotary turret or carrier and the finishing tools is shown at 30, and extends forwardly through hollow shaft 27, which forms a bearing for the driving shaft 30, and rearwardly through the frame of the machine, the rear end being journaled in box 34. Said driving shaft 30 carries the gear wheel 31, from which the rotary turret is actuated, the cam drum 32, by which the tenon forming and finishing cutter head is actuated, and the worm gear 33 at the rear end of the shaft, by which the shaft is rotated.

Meshing with the worm gear 33 is a worm 35 formed on shaft 37 which is journaled on the frame of the machine at the rear end in boxes 36 and 38. The outer end of shaft 37 carries the clutch member 39, which slides on the shaft 37 through a feather and groove connection, and may be thrown into engagement with clutch member 40 on driving pulley 41 by means of shipper lever 42 pivoted at 43 on a bracket 44 secured to the frame 20. The driving pulley 41 may be rotated continuously by a belt from any suitable source of power.

The mechanism for intermittently rotating the turret consists of the gear 31 (Figs.

2 and 6) secured to shaft 30, the gear 45 meshing with gear 31 and keyed to shaft 46, to which is also keyed the eccentric 47, the whole revolving as a unit in bearings 48 and 49 supported on the machine frame. The eccentric strap 47ª carries a fork 47ᵇ guided by shaft 30, which extends through a slot between the arms of the fork. On one arm of the fork 47ᵇ is a pawl 50 pivoted at 51 and held in engagement with the ratchet wheel 29 by spring 52 (Fig. 6). Thus as the driving shaft 30 rotates, the pawl 50 will be caused to reciprocate up and down by the eccentric, thereby imparting to the rotary turret a step-by-step or intermittent motion.

The turret is provided with a series of clamps for holding and presenting the piece of wood to the several cutting devices. As one of the principal uses of the invention is for forming dovetailed tenons on chair posts or chair legs, I have used a chair post or leg in the drawings for the purpose of illustration, and have shown clamps adapted to grip such posts, it being understood that the invention is not limited to this particular form or use. The clamps for holding and carrying the chair posts consist of pairs of clamping members 53 and 54 secured on the periphery of the turret at the ends of the several arms 25. Each clamping member 53 and 54 (Figs. 11, 12 and 13) is adjustably secured to a block 55 which works in a slot formed in the periphery of the turret 21. A short shaft 56, made with right and left hand threads on its opposite ends to admit of adjustment, extends through lugs projecting from the inner sides of the two blocks 55. On shaft 56 are the cams 57 and 58 which slide on feathers 59 and 60. Washers 61 bear on the outer sides of these cams and the adjustment is made by nuts 62 and 63. A lever 64 is rigidly fastened to the center of shaft 56 and acts to draw the blocks 55, together with the clamping members, toward each other as the cams 57 and 58 carried by shaft 56 ride up the inclined surfaces of the lugs on the under side of blocks 55. Coil springs 66 tend to press the clamp blocks toward and to hold them in engagement with the cams at all times. Said shaft 56 is rocked by lever 64 for the purpose of closing and opening the clamps as lever 64 passes over the clamp-actuating bar 65 during the rotation of the turret. On the end of lever 64 is a stop 64ª (Fig. 12) to prevent the lever from swinging too far in its inoperative or released position. The clamping members 53 and 54 may be adjusted to various angular positions as shown by dotted lines in Fig. 11, by means of pivot screw 67 and adjusting screw 67ª which passes through a slot 68 in the clamping member, and may be used to bind the clamp in any desired adjusted position. A stop plate 69 is fastened to the turret 21 opposite each clamp by a screw 70 passing through a slot 71, by which said plate may be adjusted in height.

For cutting a tenon 83 with its face $a$ at an angle with the face of the post (Figs. 13 and 17), blocks 72 may be fastened to the clamping members 53 and 54, the faces of which blocks are parallel to each other but at an angle to the faces of the clamping members. Said blocks may be secured to the clamping members by screws 73.

The first cutting mechanism to be brought into action for forming the tenon consists of a gang of saws 74 of approved form mounted separately on a hub 76, carried on a shaft 79 which revolves in suitable bearings 80 on head 85. Said saws 74 are in planes inclined to the axis of their shafts, as shown. Another gang of saws 75 is mounted on a hub 78, which is secured to shaft 77, turning in bearings 80ª also carried by said head 85. Said shafts 77 and 79 are rotated by pulleys 81 and 82, which may be driven by a single belt from any suitable source of power.

The two gangs of saws 74 and 75 are so arranged with relation to each other and to the stick or post clamped to the turret, that the saws 74 will cut away the post to the level of the face $a$ of the tenon 83 (Figs. 16 and 17), while the saws 75 will cut the end 84 of the tenon at the proper distance from the end of the post to the level of the surface $b$. The head 85 (Figs. 3, 4 and 5) is adjustable longitudinally of the machine to admit of varying the position of the saw cuts, or the length of the post operated upon, the base of the head 85 being mounted in guideways 86 on the top of the machine frame.

Another head 87 carrying the tools for cutting the sides of the tenon, and the finishing tools, is mounted on the top of the frame 20 and is slidable lengthwise of the frame in guides 88 (Figs. 2 to 6). The head 87 is reciprocated back and forth in its guideway by a stud 90, which projects downward through a slot 91 in the top of the frame, and is provided with a roller or cam follower 89, which works in a cam groove 32ª in cam drum 32. The cam groove 32ª is so formed that during a part of the revolution of the cam drum 32 the head 87 will dwell or stand motionless in its retracted position, while the turret is moved through one step by the mechanism already described, during which movement the saws 74 and 75 perform the first cutting operations already described.

Mounted on the head 87 are the vertical rotary shafts 92 and 93 geared together at 94 and operated by means of a bevel pinion 95 at the lower end of one of said shafts, and bevel gear 96 on the end of the shaft 97, extending lengthwise of the machine. Shaft 97 is journaled at its forward end in bearing 98 (Fig. 3) carried on the head 87, and at its rear end in the bearings 99 bolted to the machine frame. The shaft 97 extends completely through its bearings 99 and is slidable lengthwise therein so that the shaft may travel forward and back with the movement of head 87. The driving pulley 100, which may be rotated in any suitable way by a belt, is slidably mounted on shaft 97 and connected thereto by a feather and groove.

Shafts 92 and 93 carry at their upper ends the rose cutters 102 (Figs. 14 and 15) for cutting the sides of the tenons. These cutters are interchangeable for cutters of different forms and sizes to produce different shaped and different sized tenons. The cutters 102, constantly rotated through shaft 97, form the sides $c$ of the tenon 83, and are adjusted to cut away the material to the depth of the shoulder surface $b$ (Figs. 16 and 17). After being acted upon by said rose cutters it will be clear that the inner corners 130 between the base of the tenon and the two shoulders, will be left curved instead of being cleared out and finished to a sharp point at the meeting of the three intersecting planes. In order to cut out this material and finish the corner between the tenon and the shoulders to a sharp point, the post is next carried to the finishing cutters which will now be described.

A bracket 103 is fastened to the machine frame 20 (Figs. 3, 5, 7 and 9) and carries at its end a pair of rods 104 on which the carrier 105 is mounted to slide. Pivoted to carrier 105 at 106, 106, are the two levers 107, 107, to the upper ends of which are secured the chisels or cutting tools 108 which may be adjusted laterally by means of the caps 109 and clamp screws 110. The cutting edges of said cutters 108 are shaped to conform to the shape or angle of the sides of the tenon 83 which is being cut. At the lower end of each lever 107 is an adjustment screw or bolt 111 which is locked in adjusted position by a check nut 112. The two levers 107 are normally held with the cutters 108 in open or separated position by means of spring 113 connecting the lower parts of the two levers. Another spring 114, connecting the carrier 105 with the bracket 103, normally holds the carrier and levers down in their lowermost position. The upper ends of posts 104 are connected and held in place by a cap 115. The mechanism just described is for finishing the corner of the transverse shoulder $d$ (Figs. 16 and 17).

The mechanism for finishing the corners at the sides of the tenon is longitudinally at the sides of the tenon is carried by bracket 116 rigidly secured to the reciprocating head 87. The parts are shown on an enlarged scale in Figs. 9, 10 and 7. On the upper end of bracket 116 there is an adjustable block 117 which carries a pair of cutters 118, each having an angular chisel-like cutting edge. The block 117 may be adjusted vertically by means of the clamp screw 120 which passes through slot 119 in block 117 and into the bracket 116. The cutters 118 are adjustable lengthwise on block 117 by means of the clamping bar 121 and clamp screws 122.

To the lower end of bracket 116 is secured a cam bar 123 provided with cam surfaces for actuating the levers 107 which carry the cross cutting knives 108. As the head 87 moves forward the cam surface 125 on cam bar 123 engages the end of bolt or screw 124, which is adjustably mounted in the lower end of carrier 105. A check nut 126 holds bolt 124 in adjusted position. During the first part of the forward movement of the head 87, the carrier 105 will be raised by cam surface 125 and bolt 124 to the proper height to bring the cutters 108 opposite the shoulders of the tenon to be finished. As head 87 continues its forward movement, the lateral cam surfaces 127 on cam bar 123 will engage the bolts 111 on the lower ends of levers 107, thereby swinging the upper ends of the levers inward and causing the cutters 108 to enter and finish the transverse shoulders $d$ at the sides of the tenon. Continued movement of the head 87 causes the bolts 111 to ride down the inclined surfaces 128 at the rear of cam surfaces 127, thereby again opening the cutters 108 and withdrawing them from the path of the forwardly moving cutters 118 which are about to complete their stroke.

When the bolts 111 have reached the lowermost position 129 at the rear of cams 127, thereby fully retracting the cutters 108, the longitudinal cutters 118 will have reached their extreme forward position and will have cut and finished the corner between the sides of the tenon and the longitudinal shoulders, thus leaving the inner corner 130 clean and square, as shown in Figs. 16 and 17.

During the return movement of the head 87 the transverse cutters 108 will be again forced inward as the bolts 111 ride up over surfaces 128, and will tend to knock out the chip formed by the finishing cutters in the corner if the same has not already dropped out, and will also insure the completion of the transverse cut.

Referring to Figs. 1 and 3, a stop or gage is shown at 131 adjustable in a supporting bracket 132 on the frame of the machine, for gaging the position of the end of the post or stick at the point where it is inserted in the machine.

The device for actuating the clamps 53 and 54 to grip the post consists of the curved clamp actuating bar 65 (Figs. 1, 2, 3, 12 and 13) which is supported on the machine frame at its ends by brackets 133 and 134. The ends of the bar 65 are rearwardly curved, and so shaped that the clamping lever 64 will engage the inclined surface 135 at the leading end of the bar 65 as the turret revolves, and will ride up said surface 135, thereby closing the clamps at the proper time. The clamps will be held in closed position by the bar 65 until the turret has carried the clamped post beyond the position where it is acted upon by the finishing tools, whereupon a similar inclined surface 135 at the following end of bar 65 will permit the clamp to return to its normal or open position. A curved guide 136 opposite the last named surface 135 is provided to insure the return of the lever 64 to normal position and the clamp to open position.

In operation the post or stick is inserted between the clamping members 53 and 54 opposite the gage 131 in position A (Fig. 1), the turret being stationary at that time. When the turret starts to move through the action of the ratchet and pawl driving mechanism hereinbefore described, clamping lever 64 is actuated by bar 65 and the post is firmly gripped between the clamping members 53 and 54. The rotation of the turret first carries the post over the gang of saws 74, which cut away the side of the post down to the level of the face $a$ of the tenon. The post is then carried by the continued rotation of the turret over the gang of saws 75, which cut the end of the tenon down to the level of the shoulder $b$. The turret thence carries the post into the position to be acted upon by the rose cutters 102, 102, which cut the sides of the tenon. This latter action takes place when the post reaches the position B (Fig. 1). The driving mechanisms are so timed that at this point the turret stops, having completed one step, and the head 87 moves forward, carrying the rotating rose cutters 102 into the end of the post to cut the sides of the tenon, after which the head 87 is again retracted to move the cutters 102 back clear of the post. The turret thereupon makes another stop movement bringing the post into position to be acted upon by the finishing cutters 108 and 118, which operate in the manner already described. As the head 87, carrying the cam bar 123 again moves forward, the forward end 137 of the cam bar, tapered as shown, will enter one of the bushings 138 in the arms 25 of the turret, thereby locking the turret so as to hold the post in proper alinement and position with relation to the cutting tools, and to hold the turret immovable until the cutting operations are completed and the cutters withdrawn. When the head 87 has been fully retracted to its rear position the cam follower which actuates the head is in the dwell surface of the cam 32ª, during which time the turret is again rotated forward one step by its ratchet and pawl device and succeeding blanks are carried through the same course of operations.

It will be seen that after the post has been finished in position C, the clamp-actuating lever 64 will run off from bar 65 and the finished post be released from the clamp. It will also be seen that at the same time when the post at position C is being acted upon by the finishing cutters, the next succeeding post is being acted upon by the tenon forming rose cutters at the position B, and that during the period of rest while said cutters are operating, a new blank may be inserted at position A against gage 131.

If desired the clamp members 53 and 54 may be set at such angle as shown in dotted lines in Fig. 11, that the tenon instead of being cut parallel with the axis of the post will be cut at an angle thereto; or, the post may be tilted as shown in Fig. 13, to cut the tenon with its face and shoulders at an angle to the face of the post, as illustrated in Fig. 17.

I claim:

1. In a tenon cutting machine, tenon forming devices, corner cutting and finishing devices comprising transversely movable corner cutters and longitudinally movable corner cutters, mechanism to actuate said devices, and a carrier adapted to present blanks successively to said tenon forming and said corner cutting and finishing devices.

2. In a tenon cutting machine, corner cutting and finishing devices comprising a pair of transverse corner cutters, a pair of levers by which said transverse corner cutters are carried, means to swing said levers in unison to reciprocate said transverse corner cutters, a pair of longitudinal corner cutters, and means to reciprocate said longitudinal corner cutters.

3. In a tenon cutting machine, corner cutting and finishing mechanisms, comprising a movable blank carrier, a pair of transverse corner cutters normally in inoperative position out of the path of a blank supported on said carrier, means to shift said cutters into operative position, means to reciprocate said cutters while in operative position, longitudinal corner cutters, and means to reciprocate said longitudinal corner cutters.

4. In a tenon cutting machine, corner cutting and finishing mechanisms, comprising a movable blank carrier, a pair of transverse corner cutters, a slide on which said cutters are carried normally holding said cutters in inoperative position out of the path of a blank supported on said carrier, means to shift said slide and bring the cutters into operative position, and means to reciprocate said cutters on said slide while in operative position.

5. In a tenon cutting machine, corner cutting and finishing mechanisms, comprising a movable blank carrier, a pair of transverse corner cutters, a pair of levers on which said cutters are carried, a slide on which said levers are fulcrumed normally holding said cutters in inoperative position out of the path of a blank supported on said carrier, means to shift said slide and bring the cutters into operative position, and means to swing said levers in unison to reciprocate the cutters while in operative position.

6. In a tenon cutting machine, corner cutting and finishing mechanisms, comprising a movable blank carrier, a pair of transverse corner cutters, a pair of levers on which said cutters are carried, a slide on which said levers are fulcrumed normally holding said cutters in inoperative position out of the path of a blank supported on said carrier, a movable cam to shift said slide and bring the cutters into operative position, and movable cams to swing said levers in unison to reciprocate the cutters while in operative position.

7. In a tenon cutting machine, corner cutting and finishing mechanisms, comprising a movable blank carrier, a pair of transverse corner cutters, a pair of levers on which said cutters are carried, a slide on which said levers are fulcrumed normally holding said cutters in inoperative position out of the path of the blank supported on said carrier, longitudinal corner cutters, a reciprocating head on which said longitudinal corner cutters are mounted, and means actuated by said head to shift said slide and bring said transverse cutters into operative position, and to swing said levers and reciprocate said transverse cutters while in operative position.

8. In a tenon cutting machine, corner cutting and finishing mechanisms, comprising a movable blank carrier, a pair of transverse corner cutters, a pair of levers on which said cutters are carried, a slide on which said levers are fulcrumed normally holding said cutters in inoperative position out of the path of a blank supported on said carrier, means to shift said slide and bring the cutters into operative position, means to swing said levers in unison to reciprocate the cutters while in operative position, and means to lock said blank carrier stationary while said cutters are operating.

9. In a tenon cutting machine, corner cutting and finishing mechanisms, comprising a movable blank carrier, a pair of transverse corner cutters, a pair of levers on which said cutters are carried, a slide on which said levers are fulcrumed normally holding said cutters in inoperative position out of the path of a blank supported on said carrier, longitudinal corner cutters, a reciprocating head on which said longitudinal corner cutters are mounted, means actuated by said head to shift said slide and bring said transverse cutters into operative position, and to swing said levers and reciprocate said transverse cutters while in operative position, and means actuated by said head to lock said blank carrier stationary while said cutters are operating.

10. In a tenon cutting machine, tenon forming devices adapted to operate upon a blank to form a tenon, corner cutting tools comprising transversely movable corner cutters and longitudinally movable corner cutters, an intermittently operated carrier adapted to present the blanks successively to said tenon forming devices and said corner cutting tools, and mechanism to actuate both said longitudinally movable corner cutters and said transversely movable corner cutters to operate upon the same blank during a single period of rest of said carrier.

11. In a tenon cutting machine, a gang of saws to remove a portion of the blank adjacent to the tenon to be cut, tenon forming cutters reciprocating lengthwise of the tenon to cut the sides thereof, corner cutting and finishing tools, and a movable blank carrier adapted to present blanks successively to said saws, cutters and tools.

12. In a tenon cutting machine, a gang of saws to cut the face of the tenon to be formed, a gang of saws to cut the end of said tenon, tenon forming cutters to cut the sides of said tenon, corner cutting and finishing tools, and a movable blank carrier adapted to present blanks successively to said saws, cutters and tools.

13. In a tenon cutting machine, a gang of saws to remove a portion of the blank adjacent to the tenon to be cut, tenon forming cutters reciprocating lengthwise of the tenon to cut the sides thereof, corner cutting and finishing tools, a movable blank carrier adapted to present blanks successively to said saws, cutters and tools, and carrier actuating mechanism adapted to move the blanks through the zone of the saws, and to hold the carrier and blanks stationary while the side forming cutters and corner finishing tools are operating.

14. In a tenon cutting machine, tenon forming cutters to cut the sides of the tenon to be formed, lengthwise corner cutting and finishing tools, a reciprocating head on which both said tenon forming cutters and said lengthwise corner cutting and finishing tools are carried, transverse corner cutting and finishing tools, means to reciprocate said transverse corner cutting tools independently of said lengthwise corner cutting tools, and a carrier adapted to present blanks to said tenon forming and corner cutting and finishing devices.

15. In a tenon cutting mechanism, a gang of saws to remove a portion of the blank adjacent to the tenon to be cut, an adjustable head on which said saws are mounted, tenon forming cutters to cut the sides of the tenon and lengthwise corner cutting and finishing tools, both mounted on another head, said latter head and means to reciprocate the same, transverse corner cutting and finishing tools, means to reciprocate said transverse corner cutting tools independently of said lengthwise corner cutting tools, and a carrier adapted to present blanks to said saws, and to said tenon forming, and corner cutting and finishing devices.

16. In a tenon cutting mechanism, a gang of saws to remove a portion of the blank adjacent to the tenon to be cut, an adjustable head on which said saws are mounted, tenon forming cutters to cut the sides of the tenon and lengthwise corner cutting and finishing tools, both mounted on another head, said latter head and means to reciprocate the same, transverse corner cutting and finishing tools, means to reciprocate said transverse corner cutting tools independently of said lengthwise corner cutting tools, a rotary carrier adapted to present blanks to said tenon cutting devices, a series of clamps on said carrier to hold the blanks while being actuated upon by the tenon cutting devices, mechanism for each clamp to close and open the same, and a clamp actuating bar in the path of said clamp closing and opening mechanisms automatically to operate said clamps during the rotation of the carrier.

Signed by me at Bedford this twelfth day of September, 1914.

ZENO MARTELL.

Witnesses:
H. SIEGINS,
C. C. LOWE.

Copies of this patent may be obtained for five cents each, by addressing the "Commissioner of Patents, Washington, D. C."